United States Patent [19]
Takahashi et al.

[11] Patent Number: 5,316,845
[45] Date of Patent: May 31, 1994

[54] MAGNETIC RECORDING MEDIUM COMPRISING TWO MAGNETIC LAYERS EACH LAYER COMPRISING FERROMAGNETIC POWDER, BINDER, A BRANCHED AND UNBRANCHED SILICONE, WITH CARBON BLACK IN THE UPPER LAYER

[75] Inventors: Masatoshi Takahashi; Hiroo Inaba; Kazuaki Taga, all of Kanagawa, Japan

[73] Assignee: Fuji Photo Film Co., Ltd., Kanagawa, Japan

[21] Appl. No.: 69,681

[22] Filed: Jun. 1, 1993

Related U.S. Application Data

[63] Continuation of Ser. No. 687,810, Apr. 19, 1991, abandoned.

[30] Foreign Application Priority Data

Apr. 19, 1990 [JP] Japan .................................. 2-101568

[51] Int. Cl.$^5$ ............................................. G11B 5/00
[52] U.S. Cl. .................................... 428/323; 428/336; 428/447; 428/694 BM; 428/694 BP; 428/900; 428/694 BN
[58] Field of Search ............... 428/323, 336, 447, 694, 428/695, 900, 694 BM, 694 BP, 694 BN; 252/49.6, 62.54; 360/134

[56] References Cited

U.S. PATENT DOCUMENTS

| | | | |
|---|---|---|---|
| 4,135,016 | 1/1979 | Ogawa et al. | 428/64 |
| 4,539,257 | 9/1985 | Ryoke et al. | 428/323 |
| 4,844,946 | 7/1989 | Komatsu et al. | 427/48 |
| 5,051,318 | 9/1991 | Nishikawa et al. | 428/692 |
| 5,093,193 | 3/1992 | Koyama et al. | 428/336 |

FOREIGN PATENT DOCUMENTS 57-012420 1/1982 Japan .

*Primary Examiner*—Stevan A. Resan
*Attorney, Agent, or Firm*—Sughrue, Mion, Zinn, Macpeak & Seas

[57] ABSTRACT

A magnetic recording medium comprising a nonmagnetic support and at least two magnetic layers on the support, each magnetic layer containing a ferromagnetic powder and a binder, wherein the lower magnetic layer comprises at least one layer containing a branched fatty acid-modified silicone, but not carbon black, and the upper magnetic layer comprises at least one layer containing a branched fatty acid-modified silicone and carbon black having a DBP absorption oil amount of 100 to 250 ml/100 g. The magnetic recording medium has improved lubricating characteristics.

7 Claims, No Drawings

MAGNETIC RECORDING MEDIUM COMPRISING TWO MAGNETIC LAYERS EACH LAYER COMPRISING FERROMAGNETIC POWDER, BINDER, A BRANCHED AND UNBRANCHED SILICONE, WITH CARBON BLACK IN THE UPPER LAYER

This is a continuation of application Ser. No. 07/687,810 filed Apr. 19, 1991, now abandoned.

FIELD OF THE INVENTION

The present invention relates to a magnetic recording medium having a plurality of magnetic layers. More particularly it is concerned with a magnetic recording medium having a plurality of magnetic layers which is improved in lubricating characteristics by controlling blooming of a lubricant such that the lubricant surfaces over an extended period of time.

BACKGROUND OF THE INVENTION

Heretofore, in order to improve running properties of a magnetic recording medium, prior techniques included addition of carbon black to a magnetic layer or addition of a lubricant to the surface or the interior of the magnetic layer.

These techniques can be applied to a magnetic recording medium of the type involving a plurality of superposed magnetic layers. For instance, JP-B-U-63-19941 (the term "JP-B-U" as used herein means an "examined Japanese utility model publication") discloses a magnetic recording medium in which carbon black is added in an upper magnetic layer. However, this magnetic recording medium is low in running durability and lubricating characteristics because it does not contain a lubricant.

JP-A-54-21304 (the term "JP-A" as used herein means an "unexamined published Japanese patent application") discloses by way of an example in the specification a magnetic recording medium which contains carbon black having an average particle diameter of 40 m$\mu$ in the upper magnetic layer and lecithin as a lubricant. However, lecithin is low in lubricating performance, and the carbon black is a commonly used one. In this magnetic recording medium, a rise in tension is experienced after running of about 400 passes. The reason for this is believed that the carbon black used is the type having the usual DBP oil absorption amount (less than 100 ml/100g) and is low in the ability to retain the lubricant. Therefore, it cannot hold the lubricating performance for an extended period of long time.

A magnetic recording medium which contains a lubricant in the upper magnetic layer and carbon black only in the lower magnetic layer is disclosed in U.S. Pat. No. 4,946,740. This magnetic recording medium, however, cannot hold its lubricating ability for a long period of time. Furthermore, since the upper magnetic layer does not contain carbon black, it cannot provide a suitable surface roughness.

From this viewpoint, a magnetic recording medium has been proposed in which carbon black is incorporated in both the upper and lower magnetic layers in JP-A-64-13225. This magnetic recording medium, however, has several problems in that plasticization arises in the lower magnetic layer, no sufficient durability can be obtained, and the lubricating action of the lubricant added to the magnetic layer unit is not sufficiently exhibited.

SUMMARY OF THE INVENTION

Investigations on the prior art problems revealed that the problem of plasticization encountered in JP-A-64-13225 is attributable to the presence of the carbon black contained in the lower magnetic layer. Furthermore, in connection with the problem of the insufficient lubrication action of the surface of the magnetic layer, it has been ascertained that the carbon black in the lower magnetic layer absorbs the lubricant. As a consequence, the lubricant does not sufficiently bloom out to the surface of the magnetic layer and the blooming rate cannot be controlled satisfactorily.

The object of the present invention is to provide a magnetic recording medium which is excellent in running durability and is markedly improved in blooming, by controlling sufficiently the oozing action of the lubricant and improving the surface properties of the magnetic layer unit.

The present invention relates to magnetic recording medium comprising a non-magnetic support and at least two magnetic layers provided on the support, each magnetic layer containing a ferromagnetic powder and a binder, wherein the lower magnetic layer comprises at least one layer containing a branched fatty acid-modified silicone but not containing carbon black, and the upper magnetic layer comprises at least one layer containing a branched fatty acid-modified silicone and carbon black having a DBP absorption oil amount of 100 to 250 ml/100 g.

The magnetic recording medium of the present invention may contain linear (straight chain) fatty acid-modified silicone in both the lower magnetic layer and the upper magnetic layer.

DETAILED DESCRIPTION OF THE INVENTION

In the magnetic recording medium having a plurality of magnetic layers of the present invention, branched fatty acid-modified silicone and carbon black having a DBP (dibutyl phthalate) absorption oil amount of 100 to 250 ml/100 g are used. This type of carbon black is capable of adsorbing the branched fatty acid-modified silicone releasably holding it. Therefore, in the upper magnetic layer, a portion of the branched fatty acid-modified silicone portion is adsorbed on the carbon black and the remainder of the branched fatty acid-modified silicone portion is not adsorbed on the carbon black. The branched fatty acid-modified silicone not adsorbed on the carbon black quickly migrates to the surface of the magnetic layer, contributing to the lubrication at the initial stage of operation. Thereafter, since the lower magnetic layer does not contain the carbon black, the branched fatty acid-modified silicone contained therein gradually migrates into the upper magnetic layer. And, after approximately 100 passes, this branched fatty acid-modified silicone emerges from the surface of the upper magnetic layer, contributing to the lubrication thereof. Furthermore, the branched fatty acid-modified silicone adsorbed on the carbon black in the upper magnetic layer is gradually released and after use of about 400 passes, it also begins to come to the surface of he upper magnetic layer, contributing to the lubrication thereof. In accordance with the present invention, by employing the above construction, the oozing of the branched fatty acid-modified silicone acting as a lubricant is controlled and, therefore, a satisfactory lubrication action is attained over a wide-ranging period of use of the magnetic recording medium.

The branched fatty acid-modified silicone as used in the present invention can move relatively easily within the magnetic layer unit. In the present invention, by the presence or the absence of carbon black in the upper magnetic layer and the lower magnetic layer of the magnetic layer unit, and by containing the above branched fatty acid-modified silicone in the upper and lower magnetic layers, the lubricant is controlled so as to come out to the surface of the upper magnetic layer over a long time extending from the initial stage of use to more than 400 passes. Thus, an excellent lubricating action is maintained over an extended period of time. As a result, the rise in tension from the initial stage to more than 400 passes is decreased. It is believed for the present invention, as described above, that the oozing rate of the lubricant is advantageously controlled and, as a result, the magnetic coating is increased in strength without plasticization of the magnetic layer by virtue of the branched fatty acid-modified silicone itself.

It is further believed that since the lower magnetic layer of the present invention does not contain carbon black, the prior drawback of plasticization of the magnetic layer due to addition of the carbon black is avoided, and also the magnetic coating is increased in strength. Yet, in the present invention, since the upper layer does contain carbon black, the surface of the magnetic layer unit has a suitable roughness.

Moreover, in the present invention, it is preferred that the upper and lower magnetic layers contain linear fatty acid-modified silicone in combination with the branched fatty acid-modified silicone. This is desirable because the branched fatty acid-modified silicone migrates more easily within the magnetic layer unit than the linear fatty acid-modified silicone due to the fact that the branched fatty acid has a lower melting point. Thus, use of the linear fatty acid-modified silicone in combination with the branched fatty acid-modified silicone alters the time necessary for he silicone to ooze to the surface of the magnetic layer unit. As a result, the lubricant is supplied more uniformly from the initial stage to more than 400 passes.

In the magnetic recording medium of the present invention, the upper magnetic layer may be composed of one layer or of two or more layers, and also the lower magnetic layer may be composed of one layer or of two or more layers.

As the branched fatty acid-modified silicone to be used in the present invention, an organic silicone compound represented by the following general formula (I) is preferably used.

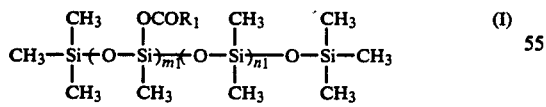

wherein $R_1$ is a branched and saturated hydrocarbon group having 7 to 24 carbon atoms, preferably 13 to 21 carbon atoms, $m_1$ is an integer of 1 to 100, preferably 3 to 60, $n_1$ is an integer of 0 to 250, preferably 15 to 190, and $m_1 \geq n_1/5$.

In a compound of formula (I), the hydrocarbon group of the fatty acid portion of the conventional linear fatty acid-modified silicone is replaced by a branched and saturated hydrocarbon group. Thus, fluidity is imparted and fluid lubricancy is increased. Although an unmodified silicone compound is excellent in fluidity, it cannot be used because of its low compatibility with a binder. In a compound of formula (I), however, fluidity and compatibility with a binder are improved contemporaneously, and this compound exhibits an excellent coefficient of friction ($\mu$ value) even under high temperature and high humidity conditions.

As the compound of formula (I), virtually, any compound can be used as long as it is a silicone compound subjected to acylation modification with a branched and saturated higher fatty acid having a specified carbon number range, irrespective of the branch structure thereof, and it can be chosen within a relatively wide molecular weight range.

Representative examples of the branched and saturated higher fatty acid are those of the 2-branched fatty acid type wherein $R_1$ is —$CH(C_6H_{13})C_8H_{17}$, —$CH(C_7H_{15})C_9H_{19}$, —$CH(C_8H_{17})C_{10}H_{21}$, —$CH(C_{10}H_{21})C_{12}H_{25}$, and the like, those having complicated branched structures obtained by the oxo method (e.g., isostearic acid-based compounds produced by Nissan Kagaku Co., Ltd.), and the mixture of isomer structures having a methyl group as a side chain at the linear aliphatic group (methyl branched fatty acid, produced by Emery Corp. U.S.A.).

This branched fatty acid of the present invention is a compound(s) obtained by the Gerbe method as described in ULMAN'S ENCYCLOPEDIA INDUSTRIAL CHEMISTRY, Vol. A10, p. 288, or the oxo method as described in KIRK-OTHMER Encyclopedia of Chemical Technology, or obtained as by-products as the time of dimer acid synthesis as described in LUMAN's ENCYCLOPEDIA INDUSTRIAL CHEMISTRY, Vol. A8, p. 535.

Representative examples of the above organic silicone compound of formula (I) are shown below.

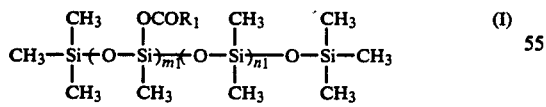

| Compound | $m_1$ | $n_1$ | $R_1$ |
|---|---|---|---|
| A | 25 | 73 | Isostearic acid radical by the oxo method (derived from isostearic acid produced by Nissan Kagaku Co., Ltd.) |
| B | 25 | 73 | 1-Heptyldecyl group |
| C | 50 | 48 | Isostearic acid radical by the oxo method (isostearic acid radical produced by Nissan Kagaku Co., Ltd.) |
| D | 1 | 4 | Isostearic acid radical by the oxo method (isostearic acid radical produced by Nissan Kagaku Co., Ltd.) |
| E | 100 | 180 | Isostearic acid radical by the oxo method (isostearic acid radical produced by Nissan Kagaku Co., Ltd.) |
| F | 25 | 100 | Isostearic acid radical by the oxo method (isostearic acid radical produced by Nissan Kagaku Co., Ltd.) |
| G | 25 | 230 | Isostearic acid radical by the oxo method (isostearic acid radical produced by Nissan Kagaku Co., Ltd.) |
| H | 75 | 230 | Isostearic acid radical by the oxo method (isostearic acid radical produced by Nissan Kagaku Co., Ltd.) |
| I | 100 | 240 | Isostearic acid radical by the |

-continued

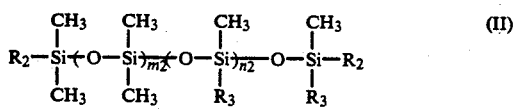

| Compound | $m_1$ | $n_1$ | $R_1$ |
|---|---|---|---|
| | | | oxo method (isostearic acid radical produced by Nissan Kagaku Co., Ltd.) |

The amount of the organic silicone compound used in each of the lower magnetic layer and the upper magnetic layer is suitably 0.1 to 5% by weight, more preferably 0.5 to 3%, based on the weight of ferromagnetic powder contained in the lower magnetic layer and the upper magnetic layer, respectively.

As the linear fatty acid-modified silicone to be used in combination with the above-described branched fatty acid-modified silicone, the silicone oil represented by the following general formula (II), described in JP-A-56-80827, can be used.

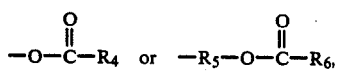

wherein $R_2$ and $R_3$ each represents a methyl group or a group represented by $$-O-\overset{O}{\underset{\|}{C}}-R_4 \quad \text{or} \quad -R_5-O-\overset{O}{\underset{\|}{C}}-R_6,$$

provided that $R_2$ and $R_3$ are not methyl groups at the same time; $R_4$ and $R_6$ each represents an alkyl group having 1 to 20 carbon atoms; $R_5$ is an alkylene group having 1 to 20 carbon atoms; $m_2$ is an integer of 0 to 100, preferably 0 to 90; and $n_2$ is an integer of 1 to 100, preferably 1 to 50.

Representative examples of the silicone oil represented by formula (II) are compounds in which $R_2$ is a methyl group, $R_3$ is

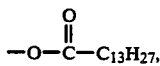

$m_2 = 20$, and $n_2 = 1$.

Representative examples of the linear fatty acid-modified silicone are lauric acid-modified silicone, tridecylic acid-modified silicone, myristylic acid-modified silicone, palmitic acid-modified silicone, stearic acid-modified silicone, oleic acid-modified silicone, elaidic acid-modified silicone, and undecylic acid-modified silicone.

The amount of the linear fatty acid-modified silicone added is preferably 0.1 to 10% by weight, more preferably 0.5 to 5% by weight based on the ferromagnetic powder in each magnetic layer.

As the carbon black having a DBP absorption oil amount of 100 to 250 ml/100 g, preferably 150 to 250 mol/100g, to be incorporated in the upper magnetic layer, commercially available carbon blacks having a DBP absorption oil amount falling within the above range can be used. The DBP absorption oil amount is measured according to JIS K6221.

As the above-described carbon black, conventional carbon black satisfying the above requirements, such as furnace black, color black, and acetylene black, can be used. Carbon black having a partially grafted surface may be used. Carbon black having an average particle diameter of about 15 to 500 mμ is preferably used. Finely divided carbon black particles and coarsely divided carbon black particles can be used in combination.

The amount of the above carbon black added is preferably 0.1 to 10% by weight, more preferably 0.5 to 5% by weight based on the weight of ferromagnetic powder in the upper magnetic layer.

As the ferromagnetic fine powder to be used in the present invention, conventionally known ferromagnetic fine powder, such as γ-iron oxide ferromagnetic powder, cobalt γ-iron oxide-base ferromagnetic powder, ferromagnetic chromium dioxide fine powder, ferromagnetic metal or alloy fine powder, iron nitride-base ferromagnetic powder, hexagonal ferrite-base ferromagnetic powder, e.g., barium ferrite and strontium ferrite can be used. This ferromagnetic fine powder can be produced by the known method. In the present invention, a ferromagnetic powder used in the upper magnetic layer preferably has a specific surface area (as determined by the BET method) of at least 35 m²/g, preferably at least 45 m²/g, and a crystal size of not more than 300 Å, preferably not more than 250 Å, and a ferromagnetic powder used in the lowe magnetic layer preferably has a specific surface area of less than 45 m²/g and a crystal size of not more than 300 Å.

The form of the ferromagnetic powder is not critical. Usually, needle-like, granular, cubic, rice grain-like, or plate-like powder can be used.

As the binder for use in the magnetic layer unit of the present invention, any of known thermoplastic resins, thermosetting resins, radiation-curable resins, reaction type resins, or mixtures thereof which are used in conventional magnetic recording medium can be used. More preferably, the above binder contains a substance which is curable or polymerizable upon irradiation with radiation.

Examples of the above thermoplastic resin include an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid estervinylidene chloride copolymer, a methacrylic acid esterstyrene copolymer, a vinyl chloride-based copolymer (details are described hereinafter), a polyurethane resin (details are described hereinafter), a urethane elastomer, a nylon-silicone-based resin, a nitrocellulose-polyamide resin, polyvinyl fluoride, a vinylidene chloride-acrylonitrile copolymer, a butadieneacrylonitrile copolymer, a polyamide resin, polyvinyl butyral, cellulose derivatives (cellulose acetate butyrate, cellulose diacetate, cellulose triacetate, cellulose propionate, nitrocellulose, etc.), a styrenebutadiene copolymer, a polyester resin, a chlorovinyl ether-acrylic acid ester copolymer, an amino resin, and various synthetic rubber-based thermoplastic resins.

The above thermosetting resin or the reactiontype resin has a molecular weight of not more than 200,000 in the state of a coating solution, and upon heating of the resin, the molecular weight becomes greatly propagated. Examples are a phenol resin, a phenoxy resin, an epoxy resin, a polyurethane curable type resin, a urea resin, a melamine resin, an alkyd resin, a silicone resin, an acryl-based reactive resin, an epoxy-polyamide resin, a nitrocellulose-melamine resin, a mixture of a high molecular weight polyester resin and an isocyanate prepolymer, a mixture of methacrylic acid salt copolymer and a diisocyanate prepolymer, a mixture of polyesterolyol and polyisocyanate, a urea-formaldehyde resin, a mixture of a low molecular weight glycol, a high molecular weight glycol and triphenylmethane triisocyanate, a polyamide resin, and mixtures thereof.

As the radiation-curable resin, a resin containing at least one carbon-carbon unsaturated bond which is curable upon irradiation with radiation can be used. Examples are those obtained by introducing a compound containing therein at least one carbon-carbon unsaturated bond into the above vinyl chloride-based copolymer or polyurethane resin by using it as a comonomer at the time of polymerization or by reacting it with the above vinyl chloride-based copolymer or polyurethane resin. As the compound containing at least one carbon-carbon unsaturated bond, a compound containing at least one acryloyl or methacryloyl group in the molecule thereof is preferably used. These compounds may further contain a glycidyl group or a hydroxyl group.

To the above binder may be added a compound which is polymerizable upon irradiation with radiation. Examples of such compounds include acrylic or methacrylic acid esters, acrylamides or methacrylamides, allyl compounds, vinyl ethers, vinylesters, vinyl heterocyclic compounds, N-vinyl compounds, styrenes, acrylic acid, methacrylic acid, crotonic acids, itaconic acids, olefins, and the like. Of these compounds, compounds containing at least two acryloyl or methacryloyl groups in the molecule, such as diethyleneglycol diacrylate or dimethacrylate, triethyleneglycol diacrylate or dimethacrylate, trimethyloylpropane triacrylate or trimethacrylate, pentaerythritol tetraacrylate or tetramethacrylate, a reaction product of polyisocyanate and polyacrylate or polymethacrylate, and the like, are preferably used.

As the above vinyl chloride-based copolymer, those having a softening temperature of not more than 150° C. and an average molecular weight of about 10,000 to 300,000 can be used.

Examples of preferred vinyl chloride-based copolymers include a vinyl chloride-vinyl acetate copolymer, a vinyl chloride-vinyl acetate-maleic acid copolymer, a vinyl chloride-vinyl acetate-vinyl alcohol copolymer, a vinyl chloride-vinyl acetate-maleic acidvinyl alcohol copolymer, a vinyl chloride-vinyl propionate-maleic acid copolymer, a vinyl chloride-vinyl propionate-vinyl alcohol copolymer, a vinyl chloride-vinyl acetate-acrylic acid copolymer, a vinyl chloride-vinyl acetate-acrylic acid-vinyl alcohol copolymer, and polymers resulting from oxidation of the above copolymers.

In particular, vinyl chloride-based copolymers having a polar group, such as a carboxylic acid group or its salt, a sulfonic acid group or its salt, a phosphoric acid or its salt, an amino group, a hydroxyl group or the like, are preferably used for increasing dispersibility of the magnetic substance.

As the above polyurethane, polyurethane produced from polyol and diisocyanate, and further a chain transfer agent, if necessary, by the known polyurethane polymerization method can be used.

The above polyol includes polyetherpolyols such as polyetherdiol, polyesterpolyols such as polyesterdiol, polycarbonatepolyols such as polycarbonatediol, and polycaprolactonediol.

Typical examples of the above polyetherpolyol are polyalkylene glycols such as polyethylene glycol and polypropylene glycol.

The above polyesterpolyol can be synthesized by, for example, polycondensation of a dihydric alcohol and a dibasic acid, or ring-opening polymerization of lactones such as caprolactone. Typical dihydric alcohols include glycols such as ethylene glycol, propylene glycol, butanediol, 1,6-hexanediol, and cyclohexanediol. Typical dibasic acids include adipic acid, pimellic acid, azelaic acid, sebacic acid, phthalic acid, and terephthalic acid.

Examples of other useful polyols include polycarbonatepolyols having a molecular weight of 300 to 20,000 and a hydroxyl group value of 20 to 300, as synthesized by condensation or ester exchange of a polyhydric alcohol represented by the following general formula (III):

$$\text{HO}-\text{R}_7-\text{OH} \quad \text{(III)}$$

wherein $R_7$ is, for example, $-(CH_2)_n-$ ($n=3$ to 14)

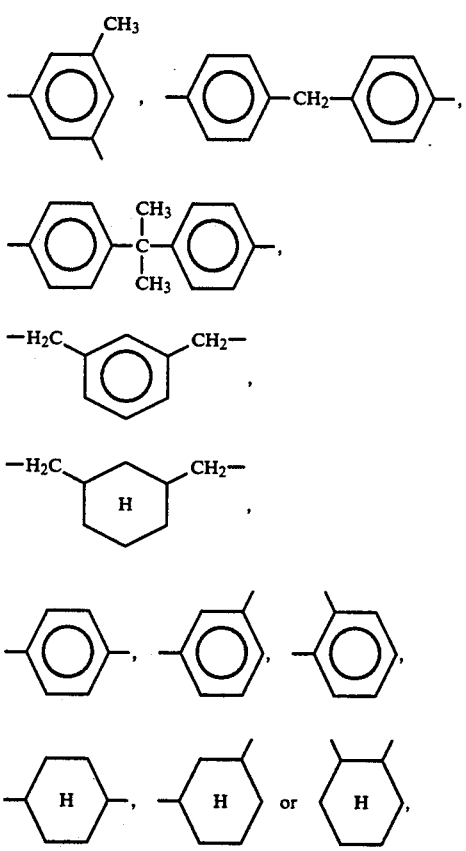

and phosgene, chloroformic acid ester, dialkylcarbonate or diarylcarbonate; or polycarbonatepolyesterpolyols having a molecular weight of 400 to 30,000 and a hydroxyl group value of 5 to 300, as synthesized by condensation of the above polycarbonatepolyol and dibasic carboxylic acid represented by the following general formula (IV):

$$\text{HOOC}-\text{R}_8-\text{COOH} \quad \text{(IV)}$$

wherein $R_8$ is an alkylene group having 3 to 6 carbon atoms, a 1,4-, 1,3- or 1,2-phenylene group, or a 1,4-, 1,3- or 1,2-cyclohexylene group.

In combination with the above types of polyol, another polyol such as polyetherpolyol, polyesteretherpolyol or polyester may be used in an amount of up to 90% by weight of the above types of polyol.

The polyisocyanate to be used for production of the polyurethane through reaction with the above types of polyol is not critical; the commonly used ones can be used. For example, hexamethylene diisocyanate, tridine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, 4,4-diphenylmethane diisocyanate, 3,3-dimethylphenylene diisocyanate, dichlorohexylmethane diisocyanate, and the like can be used.

As a chain transfer agent, for example, the above polyhydric alcohols, aliphatic polyamines, alicyclic polyamines, aromatic polyamines, and the like can be used.

The above polyurethane may contain a polar group, such as —COOM, —SO$_3$M, —OPO$_3$M, —OM, etc. (wherein M is a hydrogen atom, sodium or potassium).

Into the above binder, a compound having at least two isocyanate groups (polyisocyanate) can be incorporated. Examples of such polyisocyanates are isocyanates such as tolylene diisocyanate, 4,4-diphenylmethane diisocyanate, hexamethylene diisocyanate, xylylene diisocyanate, naphthylene 1,5-diisocyanate, otoluidine diisocyanate, isophorone diisocyanate, and triphenylmethane triisocyanate; reaction products of the above isocyanates and polyalcohols; and polyisocyanates resulting from condensation of the above isocyanates. The above polyisocyanates are sold under the trade names of Colonate L, Colonate HL, Colonate H, Colonate EH, Colonate 2030, Colonate 2031, Colonate 2036, Colonate 3015, Colonate 3041, Colonate 2014, Millionate MR, Millionate MTL, Daltosec 1350, Daltosec 2170, and Daltosec 2280 by Nippon Polyurethane Kogyo Co., Ltd.; under the trade names of Takenate D-102, Takenate D-110N, Takenate D-200, and Takenate D-202 by Takeda Chemical Industries, Ltd.; under the trade name of Sumidule N75 by Sumitomo Bayer Co., Ltd.: under the trade names of Desmodule L, Desmodule IL, Desmodule N, and Desmodule HL by West Germany Bayer Corp.; and under the trade names of Burnock D850 and Burnock D-802 by DAINIPPON INK AND CHEMICALS, INC.

In connection with the ratio of the amount of ferromagnetic powder to the binder in the magnetic layers of the magnetic recording medium of the present invention, the amount of the binder is preferably 10 to 30 parts by weight per 100 parts by weight of the ferromagnetic powder.

In calender processing of the magnetic layer unit for the production of the magnetic recording medium of the present invention, it is preferred that the glass transition temperature Tg (peak temperature of E) of the magnetic layer unit prior to the calender processing be maintained at a temperature at least 30° C. lower, preferably at least 50° C. lower than the calender processing temperature. It is preferred that the above Tg of the magnetic layer unit be not more than 60° C., particularly not more than 40° C. In order to maintain the above Tg under the above conditions, it suffices that the type of the binder or the amount of the binder used is appropriately determined, or the amount of the solvent remaining in the magnetic layer is properly controlled. In particular, controlling the above Tg can be easily carried out by using a substance which undergoes crosslinking or polymerization upon irradiation with radiation.

The magnetic layer of the magnetic recording medium of the present invention may contain, as well as the above ferromagnetic fine powder and binder, other various additives such as a filler, an abrasive, a dispersing agent, an antistatic agent, and a lubricant. It is preferred that the amounts of the additives be lower than that of the binder.

The type of the filler is not critical; for example, a granular filler commonly used, having an average particle diameter of 0.01 to 0.8 μm, preferably 0.06 to 0.4 μm can be used. Examples of such fillers include particles of tungsten disulfide, calcium carbonate, titanium dioxide, magnetic oxide, zinc oxide, calcium oxide, litopon and talc. These fillers can be used singly or in combination with each other.

As the abrasive that can be used in the magnetic layer of the present invention, αalumina, fused alumina, silicon carbide, chromium oxide, cerium oxide, corundum, synthetic diamond, α-iron oxide, garnet, Emery (main component: corundum and magnetite), garnet, silica, silicon nitride, boron nitride, molybdenum carbide, boron carbide, tungsten carbide, titanium carbide, tripoly, diatomaceous earth, dolomite, and the like are mentioned as typical examples from a viewpoint of the durability of the magnetic layer of the magnetic recording medium, In particular, it is preferred that one to four abrasives having a Mohs' hardness of at least 6 be used in combination.

The average particle diameter of the abrasive is preferably 0.005 to 5 microns and, in particular, preferably 0.05 to 2 microns.

Dispersing agents which can be used in combinations thereof include known dispersing agents such as fatty acids having 9 to 22 carbon atoms (e.g., caprylic acid, capric acid, lauric acid, myristic acid, palmitic acid, stearic acid, oleic acid, elaidic acid, linolic acid, linolenic acid, and stearoic acid), metal soap comprising the above fatty acids and an alkali metal (e.g., lithium, sodium and potassium) or alkali earth metal (e.g., magnesium, calcium and barium), amides of the above fatty acids, aliphatic amines, higher alcohols, polyalkyleneoxide alkylphosphoric acid ester, alkylphosphoric acid ester, alkylboric acid ester, salcosinate, alkylether esters, trialkylpolyolefinoxy quaternary ammonium salts, and lecithin. When the dispersing agent is used, it is used in an amount of 0.05 to 20 parts by weight per 100 parts by weight of the binder used.

Examples of the antistatic agents that can be used include electrically conductive fine powder such as carbon black graft polymer; natural surfactants such as saponin; nonionic surfactants such as alkyleneoxide-, glycerine- and glycidol-based surfactants; cationic surfactants such as higher alkylamines, quaternary ammonium salts, salts of heterocyclic compounds such as pyridine, and phosphonium or sulfoniums; anionic surfactants containing an acidic group such as carboxylic acid, sulfonic acid, phosphoric acid, a sulfuric acid ester group, and a phosphoric acid ester group; and amphoteric surfactants such as amino acids, aminosulfonic acids, and sulfuric acid esters or phosphoric acid esters of aminoalcohols. When the above electrically conductive fine powder is used as the antistatic agent, it is used in an amount of 0.2 to 20 parts by weight per 100 parts by weight of the binder. When the surfactant is used, it is used in an amount of 0.2 to 10 parts by weight per 100 parts by weight of the binder.

In the present invention, conventionally known lubricants can also be used as long as they enhance or do not prevent or interfere with the action of the branched fatty acid-modified silicone. Lubricants which can be used include known lubricants and lubricants for plastics, such as the above fatty acids, higher alcohols, fatty acid esters of monobasic fatty acid having 12 to 20 carbon atoms and monohydric or polyhydric alcohols, e.g., butyl stearate and sorbitan oleate, mineral oil, animal or vegetable oil, olefin low molecular weight polymers, $\alpha$-olefin low molecular weight polymer, graphite fine powder, molybdenum disulfide fine powder, and teflon fine powder. The amount of the lubricant added can be determined appropriately according to a known technique.

The magnetic recording medium of the present invention can be produced by essentially the same technique as the conventional one for production of a magnetic recording medium having a plurality of magnetic layers. In the present invention, a magnetic coating composition is produced by kneading. The solvent to be used in kneading is not critical and those used in the usual magnetic coating compositions can be used.

The kneading method is not critical, and the order in which the above components are added can be determined appropriately under conventional protocol.

In preparation of the magnetic coating composition, the usual kneading machines, such as two-roll mill, a three-roll mill, a ball mill, a pebble mill, a tron mill, a sand grinder, a Szegvari attritor, a high-speed impeller dispersing machine, a high-speed stone mill, a high-speed impact mill, a disper, a kneader, a high-speed mixer, a homogenizer, and a supersonic dispersing machine, can be used.

Additives such as a dispersing agent, an antistatic agent and a lubricant as described above are not limited to those having only the above-described action or effect. For example, the dispersing agent sometimes acts as a lubricant or an antistatic agent. Accordingly, the action or effect of the compound as described above under the specified category is not particularly limited to the above characterized action or effect. That is, compounds having a plurality of actions or effects can be used. When such substances are used, the amount of the substance added is preferably determined taking into consideration the overall action or effect imparted by the compound thereof.

In addition, a cleaning dispersing agent, a viscosity index increasing agent, a luidity decreasing agent, a defoaming agent, and the like can be added.

The viscosity of the magnetic coating composition thus prepared is usually in the range of 60 to 200 ps.

The magnetic coating composition can be coated directly onto the above non-magnetic support. In addition, it can be coated on the non-magnetic support after application of physical treatment (e.g., corona discharging treatment and electron ray irradiation treatment).

Coating of the magnetic coating compositions on the non-magnetic support can be carried out, for example, by air doctor coating, blade coating, rod coating, extrusion coating, air knife coating, squeeze coating, dip coating, reverse roll coating, transfer roll coating, gravure coating, kiss coating, cast coating, spray coating or spin coating. Other conventional coating methods can also be employed. A simultaneous multi-layer coating method (Wet-on-Wet method) can be employed. In accordance with any suitable coating method, the upper magnetic layer and the lower magnetic layer are formed.

The thickness of the coating is preferably chosen so that the thickness of the magnetic layer unit of the magnetic recording medium finally obtained is within the range of 2 to 10 $\mu$m, wherein the upper magnetic layer preferably has a thickness of 0.5 to 4 $\mu$m and the lower magnetic layer preferably has 1.5 to 7 $\mu$m.

In general, the coated layer thus formed is subjected to magnetic field orientation treatment in a wet state to thereby orient the ferromagnetic fine powder in the magnetic layer. This magnetic field orientation treatment can be carried out by the usual method.

Thereafter, the coated layer is dried to form a magnetic layer. This drying is carried out by heating the coated layer usually at 50° to 120° C. The heating time is usually from 10 seconds to 5 minutes.

After drying, usually, surface smoothening treatment is applied to the magnetic layer.

The surface smoothening treatment is carried out by calender treatment. This calender treatment preferably includes a step where heat and pressure are applied by the use of at least one pair (two stages), preferably at least three stage stiff roll. As the above stiff roll, a metal roll having a central surface roughness (Ra: cutoff value 0.25 mm) of about not more than 20 nm, more preferably about 10 nm is preferably used. Examples of the stiff roll are various steel rolls the surface of which is subjected to hard chromium plating or ceramic coating, or the surface of which is made of super hard alloy. Prior to and/or after the step using the above at least one pair stiff roll, a step in which a combined roll of a stiff roll and an elastic roll as commonly used in the usual calender treatment may be provided.

The above calender treatment is preferably carried out at a temperature of 50° to 110° C. and under a line pressure of 50 to 1,000 kg/cm, preferably 50 to 350 kg/cm. If the above line pressure condition is lower than the above range, a magnetic recording medium excellent in electromagnetic characteristics and running characteristics cannot be produced. If the above line pressure condition is above the above range, the magnetic recording medium is deformed or the stiff roll is broken.

After the above surface smoothening treatment and, if desired, after the radiation irradiation treatment or heat treatment, the material is cut to the desired form to thereby produce a magnetic recording medium.

For the above radiation treatment, as radiation sources for irradiation, electron rays, $\gamma$ rays, $\beta$ rays, ultraviolet rays and the like can be employed. Preferably, electron rays are employed. Irradiation with electron rays is carried out by the use of an electron ray accelerator. Upon irradiation of radiation, the binder component of the magnetic coating composition coated on the non-magnetic support undergoes polymerization, leading to hardening.

As the electron ray source for irradiation, one under an accelerated voltage of 100 to 500 kV, preferably 150 to 300 kV is generally employed. The dose is generally 1.0 to 20 Mrad and preferably 2 to 10 Mrad. If the accelerated voltage is less than 100 kV, the energy is not sufficient and the curing reaction of the magnetic layer does not proceed completely. On the other hand, if it is more than 500 kV, the energy applied is more than the energy required for the polymerization reaction, exerting adverse influences on the magnetic layer and the non-magnetic support.

If the dose is less than 1.0 Mrad, the curing reaction proceeds only insufficiently and the resulting magnetic layer does not have a sufficiently high strength. On the other hand, if it is more than 20 Mrad, the energy efficiency is decreased. This condition is not economical, and moreover, the member to be irradiated sometimes produces heat and as a result of the generation of heat, the non-magnetic support sometimes is deformed.

By carrying out the above radiation (electron ray) irradiation step, the magnetic layer curing step can be greatly shortened as compared with the usual heat curing treatment. Moreover, the amount of the solvent used at the time of production can be greatly decreased, and immediately after the production, the quality is stabilized. Thus, an advantage is realized in that the product can be immediately delivered.

Although it is preferred that the radiation is applied after both steps of coating of the magnetic coating composition followed by the calender treatment, it is also possible that the calender treatment is applied after the irradiation. Moreover, in the latter instance, the radiation can be applied once again after the calender treatment.

The opposite surface of the non-magnetic support from which the magnetic layer is arranged may be provided with a known back layer. This back layer is, for example, a thin film layer comprising carbon black and a binder in which inorganic filler particles having a Mohs' hardness of at least 5, and having a thickness of not more than 0.6 μm.

In the magnetic recording medium having a plurality of magnetic layers of the present invention, the lower magnetic layer contains branched fatty acid-modified silicone but not carbon black, and the upper magnetic layer contains branched fatty acid-modified silicone and carbon black having a DBP absorption oil amount of 100 to 250 ml/100 g. Thus, the rate of oozing of the modified silicone is controlled, and the lubricating action of the surface of the magnetic layer is maintained uniformly over a long period of time. Moreover, since the branched fatty acid-modified silicone is not susceptible to plasticization action, the strength of the magnetic coating (magnetic layer) is increased and the tension does not increase from the initial stage to more than 400 passes. Moreover, since the lower magnetic layer does not contain carbon black, no plasticization is caused in the lower magnetic layer by the presence of carbon black. Moreover, since the upper magnetic layer contains carbon black, the surface of the magnetic layer has a suitable surface roughness, and excellent running durability is obtained.

The present invention is described in greater detail with reference to the following example. All parts are by weight unless otherwise indicated.

EXAMPLE

A magnetic coating solution was prepared according to the following processing.

| Magnetic Coating Solution for Lower Magnetic Layer | |
|---|---|
| Cobalt-modified iron oxide (Normal Hc 350 Oe; specific surface area 26 m$^2$/g; crystal size 450 angstroms; particle size (long axis diameter) 0.33 μm; acicular ratio 8) | 100 parts |
| Vinyl chloride-vinyl acetate-vinyl alcohol copolymer (containing 5 × 10$^{-6}$ eq/g of a polar group of —N(C$_2$H$_5$)Cl; composition ratio by weight 86:13:1; degree of polymerization 400) | 13 parts |
| Polyesterpolyurethane resin | 5 parts |
| α-Al$_2$O$_3$ (particle size 0.3 μm) | 1 part |
| Carbon black | See Table 1 |
| Branched fatty acid-modified silicone | X parts |
| Linear fatty acid-modified silicone | Y parts |
| Myristic acid | 1 part |
| Butyl acetate | 200 parts |
| Magnetic Coating Solution For Upper Magnetic Layer | |
| Cobalt-modified iron oxide (normal Hc 480 Oe; specific surface area 35 m$^2$/g; crystal size 350 angstroms; particle size (long axis diameter) 0.30 μm; acicular ratio 10) | 100 parts |
| Vinyl chloride-vinyl acetate-vinyl alcohol copolymer (composition ratio by weight 91:3:6; degree of polymerization 400) | 12 parts |
| Polyesterpolyurethane resin (containing 10$^{-4}$ mol/g of carboxyl group | 3 parts |
| α-Alumina (particle size 0.3 μm) | 2 parts |
| Carbon black | See Table 1 |
| Branched fatty acid-modified silicone | X parts |
| Linear fatty acid-modified silicone | Y parts |
| Lauric acid | 1 part |
| Butyl acetate | 200 parts |

For each of the above two magnetic coating solutions, ingredients were kneaded in a continuous kneader and then dispersed by the use of a sand mill. To the dispersion thus obtained, polyisocyanate was added in an amount of 1 part for the coating solution of the lower magnetic layer, and in an amount of 3 parts for the coating solution of the upper magnetic layer. In addition, 40 parts of butyl acetate was added to each coating solution. Each resulting mixture was filtered by the use of a filter having an average pore diameter of 1 μm to prepare the coating solutions for the lower magnetic layer and the upper magnetic layer.

The coating solution for the lower magnetic layer was coated on a polyethylene terephthalate film having a thickness of 7 μm and a central line surface roughness of 0.02 μm in such a manner that the dry thickness was 3.0 μm, and immediately thereafter, the upper coating solution was coated thereover so that the thickness of the second magnetic layer was 2.0 μm. While the both layers were in a wet condition, orientation was carried out by the use of a cobalt magnet having a force of 3,000G and a solenoid of 1,500G. After drying, calender treatment was performed at a temperature of 90° C. by the use of a 7-stage calender comprising only metal rolls, and the coated film was slit to a width of 3.8 mm to produce an audio tape.

Evaluating Method

Measurement of Running Durability

Reciprocal running (one running=1 R) was carried for one minute by the use of JCK-50 produced by Sharp Co., Ltd., and the number of rounds until the running stopped was counted.

A: 400 R or more
B: 300 R to less than 400 R

C: Less than 300 R

Measurement of Blooming

Blooming was examined in terms of tape angle measured in the following manner.

1 m of a 3.8 mm-wide tape was wound on a cylindrical glass tube having a diameter of 1 inch and was allowed to stand under conditions of 60° C. and 90%. Thereafter, after it was allowed to stand at room temperature for 4 hours, the tape was removed while turning the glass tube. The tape angle after removal was measured.

A: 0 to less than 45°
B: 45° to less than 90°
C: 90° or more

The results are shown in Table 1.

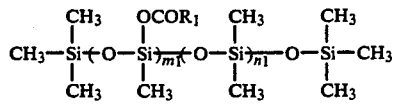

wherein $R_1$ is a branched and saturated hydrocarbon group having 7 to 24 carbons, $m_1$ is an integer of 1 to 100, $n_1$ is an integer of 0 to 250, an $m_1 \geq n_1/5$;

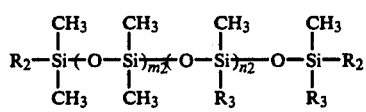

wherein $R_2$ and $R_3$ each represents a methyl group or a group represented by

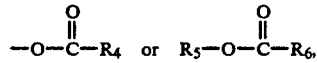

provided that $R_2$ and $R_3$ do not represent methyl groups at the same time; $R_4$ and $R_6$ each represents an alkyl group having 1 to 20 carbon atoms; $R_5$ is an alkylene group having 1 to 20 carbon atoms; $m_2$ is an integer of 0 to 100; and $n_2$ is an integer of 1 to 100;

and wherein said lower magnetic layer does not contain carbon black, and said upper magnetic layer contains carbon black having a dibutyl phthalate absorption oil amount of 100 to 250 ml/100 g and an average particle diameter of 15 to 500 m$\mu$, said carbon black being present in an amount of 0.5% to 10% by weight based on weight of ferromagnetic powder in said upper magnetic layer.

2. A magnetic recording medium as recited in claim 1, wherein the amount of said branched fatty acid-modified silicone is from 0.1 to 5 percent by weight of the

TABLE 1

| No. | Type of Fatty Acid-Modified Silicone (AMS) Lubricant | | Amount of Lubricant (X/Y) | | Carbon Black | | Properties of Carbon Black | | Results | |
|---|---|---|---|---|---|---|---|---|---|---|
| | Branched fatty acid-modified | Linear fatty acid-modified | Upper Layer | Lower Layer | Upper Layer (parts) | Lower Layer (parts) | Particle size (m) | DBP Oil Adsorption Amount (ml/100 g) | Running Durability | Blooming |
| 1 | Isostearic AMS | — | 3.0/0 | 3.0/0 | 2.0 | none | 20 | 180 | A | A |
| 2 | Isomyristic AMS | — | " | " | " | " | " | " | A | A |
| 3 | Myristic AMS | 2.0/2.0 | 2.0/2.0 | | | | | | | |
| 4 | Isomyristic AMS | " | " | " | " | " | " | " | A | A |
| 5 | Gelbeisostearic AMS | " | " | " | " | " | " | " | A | A |
| 6 | Isostearic AMS | Oleic AMS | " | " | " | " | " | " | A | A |
| 7 | " | Myristic AMS | 0.5/0.5 | 0.5/0.5 | " | " | " | " | B | A |
| 8 | " | " | 5.0/5.0 | 5.0/5.0 | " | " | " | " | A | B |
| 9 | " | " | 1.0/1.0 | 1.0/1.0 | " | " | " | 70 | A | C |
| 10 | " | " | " | " | " | " | " | 140 | A | A |
| 11 | " | " | " | " | " | " | " | 200 | A | A |
| 12 | " | " | " | " | " | " | " | 250 | B | A |
| 13 | " | " | " | " | " | " | " | 350 | C | A |
| 14 | " | " | " | " | " | " | 50 | 180 | A | A |
| 15 | Isostearic AMS | Myristic AMS | 1.0/1.0 | 1.0/1.0 | 2.0 | none | 70 | 180 | A | A |
| 16 | — | — | 0/0 | 0/0 | " | " | 20 | " | C | A |
| 17 | Isostearic AMS | Myristic AMS | " | 1.0/1.0 | " | " | " | " | C | C |
| 18 | " | " | 1.0/1.0 | 0/0 | " | " | " | " | C | A |
| 19 | " | " | " | " | " | 2.0 | " | " | C | A |
| 20 | " | " | " | " | none | none | — | " | B | C |
| 21 | Myristic AMS* | Oleic AMS | " | " | 2.0 | " | 20 | 180 | C | A |
| 22 | Isostearic AMS | Stearic AMS | " | " | " | " | 20 | 180 | C | A |
| 23 | " | Myristic AMS | " | " | none | 2.0 | 20 | 180 | C | B |

*linear fatty acid-modified AMS

As can be seen from the results of Table 1, Sample Nos. 9 and 13, in which carbon black not having a DBP absorption oil amount of 100 to 250 ml was used, were poor in blooming or running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support, a lower magnetic layer and an upper magnetic layer, each of said lower and upper magnetic layers containing a ferromagnetic powder, a binder, a branched fatty acid-modified silicone represented by formula (I) and a linear fatty acid-modified silicone represented by formula (II):

ferromagnetic powder in each of said upper and lower magnetic layers.

3. A magnetic recording medium as recited in claim 1, wherein the amount of the linear fatty acid-modified silicone is 0.1 to 10% by weight based on amount of ferromagnetic powder in each of said upper and lower magnetic layers.

4. A magnetic recording medium as recited in claim 1, wherein said carbon black is selected from the group consisting of furnace black, color black and acetylene black.

5. A magnetic recording medium as recited in claim 1, wherein the combined thickness of the upper and lower magnetic layers is from 2 to 10 μm.

6. A magnetic recording medium as recited in claim 1, wherein said upper magnetic layer is formed on said lower magnetic layer before said lower magnetic layer has completely dried.

7. A magnetic recording medium as recited in claim 1, wherein said carbon black is present in an amount of 0.5% to 5% by weight based on weight of ferromagnetic powder in said upper magnetic layer.

* * * * *